United States Patent Office 2,829,457
Patented Apr. 8, 1958

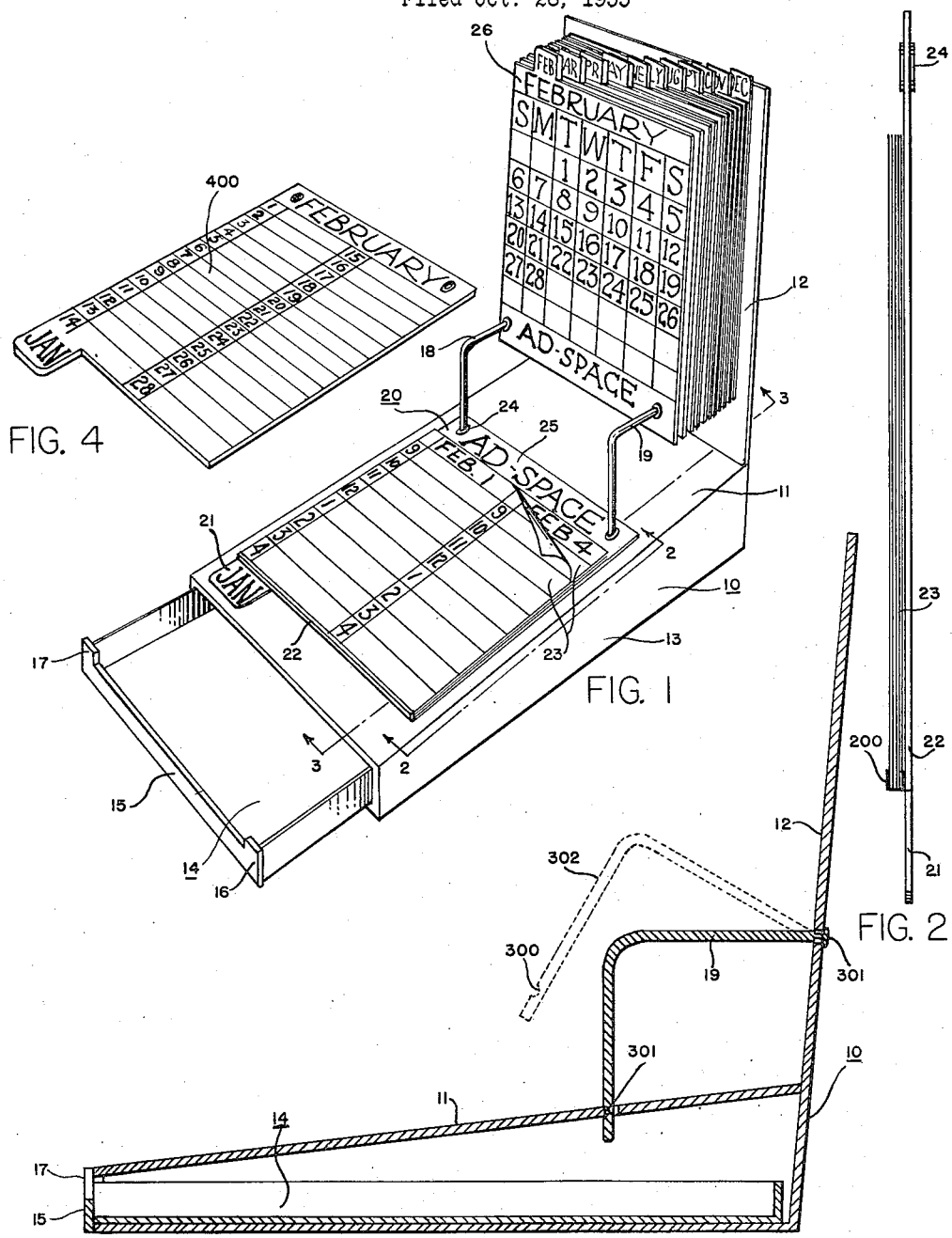

2,829,457

DESK CALENDAR OR THE LIKE

Thomas K. Marston, Ogden, Utah

Application October 28, 1955, Serial No. 543,538

1 Claim. (Cl. 40—120)

Broadly speaking, the present invention is related to selectable multi-card or multi-sheet apparatus for displaying simultaneously separate but related, selectable information, as for example a desk appointment calendar; more particularly, the present invention is directed toward the providing of a new and improved desk appointment calendar which will be extremely versatile and yet be relatively inexpensive to manufacture.

In the past, there have been many types of desk calendars designed for use in offices, homes, and schools. Desk appointment calendars, i. e. calendars which are designed to display simultaneously appointment information for a particular day have been simply multi-sheet devices on each sheet of which is printed a relatively large appointment portion and an extremely small calendar portion, each sheet of course representing a particular day of the month. It would of course be desirable to have a daily appointment calendar suitable for desk use which will simultaneously display a monthly calendar and daily appointment sheets, without necessitating the employment of two separate pads or display devices.

Therefore, it is an object of the present invention to provide a new and useful desk appointment calendar suitable for home or office use.

It is a further object of the present invention to provide a new and useful desk appointment calendar which will be extremely versatile, easily-readable, and of low manufacturing cost.

According to the present invention, each of a plurality of cards or sheets, each having a monthly calendar on a surface thereon, is provided with a plurality of thin daily appointment schedule sheets which are secured to each other and to the remaining surface of the monthly calendar card. After the month of a particular card has passed, the card is flipped over to reveal, simultaneously, a new monthly calendar card together with the appointment schedule sheet applying to the new month. Thus, each card assembly contains both a monthly calendar card and, on the opposite surface thereof, a plurality of appointment schedule sheets which will apply to the succeeding month. Suitable container means is provided to preserve the daily appointment sheets for further reference, if desired.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1 is a perspective view of a desk appointment calendar according to the present invention.

Figure 2 is an end view taken along the line 2—2 in Figure 1 of a typical calendar card, appointment sheet unit as employed by the present invention.

Figure 3 is a sectional view taken along the line 3—3 in Figure 1 showing a cross section of the support member as utilized by the present invention.

Figure 4 is an alternate form of the monthly calendar, appointment sheet unit which may be utilized in the design of the desk appointment calendar shown in Figure 1.

In Figure 1, support member 10 is provided with table portion 11, back portion 12, side portions 13, and is provided with drawer member 14. Drawer member 14 has front portion 15 with end portions 16 and 17 thereof being inclined so as to prevent drawer member 14 from being altogether closed in its retracted condition so that a suitable slot will be provided to admit the torn off appointment sheets into drawer member 14 for future reference. An alternate approach of course would be to provide a notched out end portion for table portion 11, and retain front portion 15 of drawer member 14 in a planar configuration, so as to provide the slot admission to drawer member 14. L-shaped elements 18 and 19 may either be separate or may constitute component parts of a single card retaining member, and are provided to mount selectably the monthly calendar, appointment sheet units so that they may be disposed in either of two conditions. Each monthly card, appointment sheet unit 20 is provided with a month tab 21, a monthly calendar card 22, a plurality of daily appointment sheets 23, and monthly card mount inserts 24 if desired. Monthly card 22 may also include an appropriate advertising space 25 in the card region generally between retaining elements 18 and 19. The monthly calendar for January will be on that surface of card 22 resting upon table portion 11 of support member 10. Secured to the reverse or upper side of card 22 will be the plurality of daily appointment schedule sheets 23, each of which are affixed to the remaining sheets and to the monthly card at an edge area thereof and by adhesive means, staple means, or other mechanical means. This feature is illustrated in Figure 2 in which daily appointment sheets 23 are secured together at one edge thereof by adhesive means 200. Means 200 may also be employed to adhere the plurality of daily appointment sheets 23 to monthly card 22, if desired. Or as an alternative, staples or other mechanical means may be employed. It should be mentioned tha the means by which the several daily appointment sheets are held together and the means by which the plurality of appointment sheets are attached to the monthly card may be either separate or unitary.

Figure 3 is a sectional view taken along the line 3—3 in Figure 1 showing the cross section of support member 10, with drawer 14 shown in its closed or nearly closed disposition, and illustrates the configuration and function of elements 18 and 19 in Figure 1. As is hereinbefore indicated, elements 18 and 19 retain the several calendar card, appointment sheet units either in their upright condition (see for example monthly card unit 26 in Figure 1) or in their substantially flat condition, as for example the January monthly card, appointment sheet unit. Elements 18 and 19 in Figure 3 may be provided with notched area 300 to cooperate with two suitable apertures 301 in table portion 11 of support member 10. Back portion 12 of support member 10 may be provided with suitable apertures to accommodate the insertion of elements 18 and 19. Thus, elements 18 and 19 each may be provided with a suitable retaining head 301, or member 301 may be a cross-bar joining elements 18 and 19 into a single card retaining member. The dotted line configuration 302 of elements 18 and 19 show the manner of selectable engagement of elements 18 and 19 to table portion 11 of support member 10.

It is to be noted from Figure 1, Figure 2, and Figure 3 that the appointment sheets for the succeeding months are found attached to the back of the calendar card of the preceding month. See for example Figure 1. By the unique calendar card, appointment sheet construction as is herein illustrated, it is apparent that the desk calendar accomplishes the simultaneous display of the monthly calendar card and of the several appointment sheets for that particular month. It is of course apparent that there are numerous additional configurations which support member 10 might take and yet perform equally as well.

Figure 4 is a perspective view of a calendar card on the back of which is printed a daily appointment schedule sheet. Thus, the card units of Figure 1 may be thought of as being replacable by card 400 in Figure 4. In actual practice, however, it will be noted from card 400 in Figure 4 that only one appointment may be filled in for each day of the month, hence the preference of the card units in Figure 1 which provide for hourly appointments for each day of the month.

It will be noted from Figure 1 and the discussion relating thereto that the calendar may be either of the disposable type or of the replaceable type so that, assuming the dates of the days of the months remain unchanged during the succeeding year, the appointment sheet pads would only have to be replaced.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

In combination: a support member; a plurality of sheet assemblies, each consisting of; a first sheet of substantially rectangular configuration and having a first surface and a second surface, said second surface of said first sheet being provided with an intelligence bearing area of a first character, a plurality of second sheets of substantially rectangular configuration each exhibiting a plurality of edge portions and each having a first surface and a second surface, said first surface of each of said second sheets being provided with an intelligence bearing area of a second character, means for affixing said plurality of second sheets to each other in the region of corresponding ones of said edge portions such that said intelligence bearing areas of said second sheets all face in a given direction, and means for affixing said plurality of second sheets to said first sheet so that said intelligence bearing area of said first sheet faces in an opposite direction; means for displaceably mounting said plurality of said first sheet assemblies on said support member to permit the simultaneous viewing of the said second surface of a first sheet of a chosen sheet assembly and the said first surface of one of the plurality of said second sheets of an adjacent sheet assembly; said support member including a table portion and a back portion and being provided with a slotted admittance internal region adapted to receive said second sheets as they are torn off and removed from each of said sheet assemblies, said internal region being delineated by a drawer member slidably mounted within said support member, said drawer member having a front portion and edge portions.

References Cited in the file of this patent

UNITED STATES PATENTS

| | | |
|---|---|---|
| 617,387 | Armstrong | Jan. 10, 1899 |
| 1,041,923 | Weeks | Oct. 22, 1912 |
| 1,970,839 | Caldwell | Aug. 21, 1934 |
| 1,975,779 | Church | Oct. 9, 1934 |
| 2,149,978 | Noel | Mar. 7, 1939 |
| 2,309,474 | Nielson | Jan. 26, 1943 |